United States Patent [19]

Benjamin et al.

[11] 4,240,207
[45] Dec. 23, 1980

[54] TOOL PRESETTING DEVICE

[75] Inventors: Milton L. Benjamin; David L. Beaver, both of Chagrin Falls, Ohio

[73] Assignee: Erickson Tool Company, Solon, Ohio

[21] Appl. No.: 89,609

[22] Filed: Oct. 29, 1979

[51] Int. Cl.³ .......................... G01B 5/02; B27G 23/00
[52] U.S. Cl. .................................... 33/185 R; 33/165; 33/170; 33/201; 82/34 R
[58] Field of Search ................. 33/185 R, 201, 181 R, 33/165, 170, 180 R; 82/34 R

[56] References Cited

U.S. PATENT DOCUMENTS

| | | | |
|---|---|---|---|
| 3,324,561 | 6/1967 | Zwierzynski | 33/170 X |
| 3,504,442 | 4/1970 | Allen | 33/185 R |
| 3,546,781 | 12/1970 | Cox et al. | 33/185 R |
| 3,807,049 | 4/1974 | Zajac | 33/165 |
| 3,888,015 | 6/1975 | Williams | 33/185 R |
| 4,031,628 | 6/1977 | Kaesemeyer | 33/201 |

*Primary Examiner*—William D. Martin, Jr.
*Attorney, Agent, or Firm*—Maky, Renner, Otto & Boisselle

[57] ABSTRACT

A tool presetting device for longitudinally presetting an end cutting tool in a tool holder for use in a single or multiple spindle automatic bar machine characterized in that the device has a tool holder support which non-rotatably holds the tool holder in a predetermined axial position for axial adjustment of the tool to engage a preset micrometer which is clamped in one end of a micrometer holder. The other end of the micrometer holder is frictionally swingably retained in a selected groove of a grooved bar which is parallel to the tool holder and tool for swinging movement of the micrometer in a plane perpendicular to the tool holder and tool axis from a position laterally clearing the tool holder and tool for axial insertion and removal of the tool holder and tool from the tool holder support to a position whereat the end of the tool may be axially advanced with respect to the tool holder for engagement with the micrometer. The grooves in the bar provide for adjustment of the micrometer holder in 1″ increments while the micrometer provides for precise adjustment from 0.000 to 1.000″.

10 Claims, 5 Drawing Figures

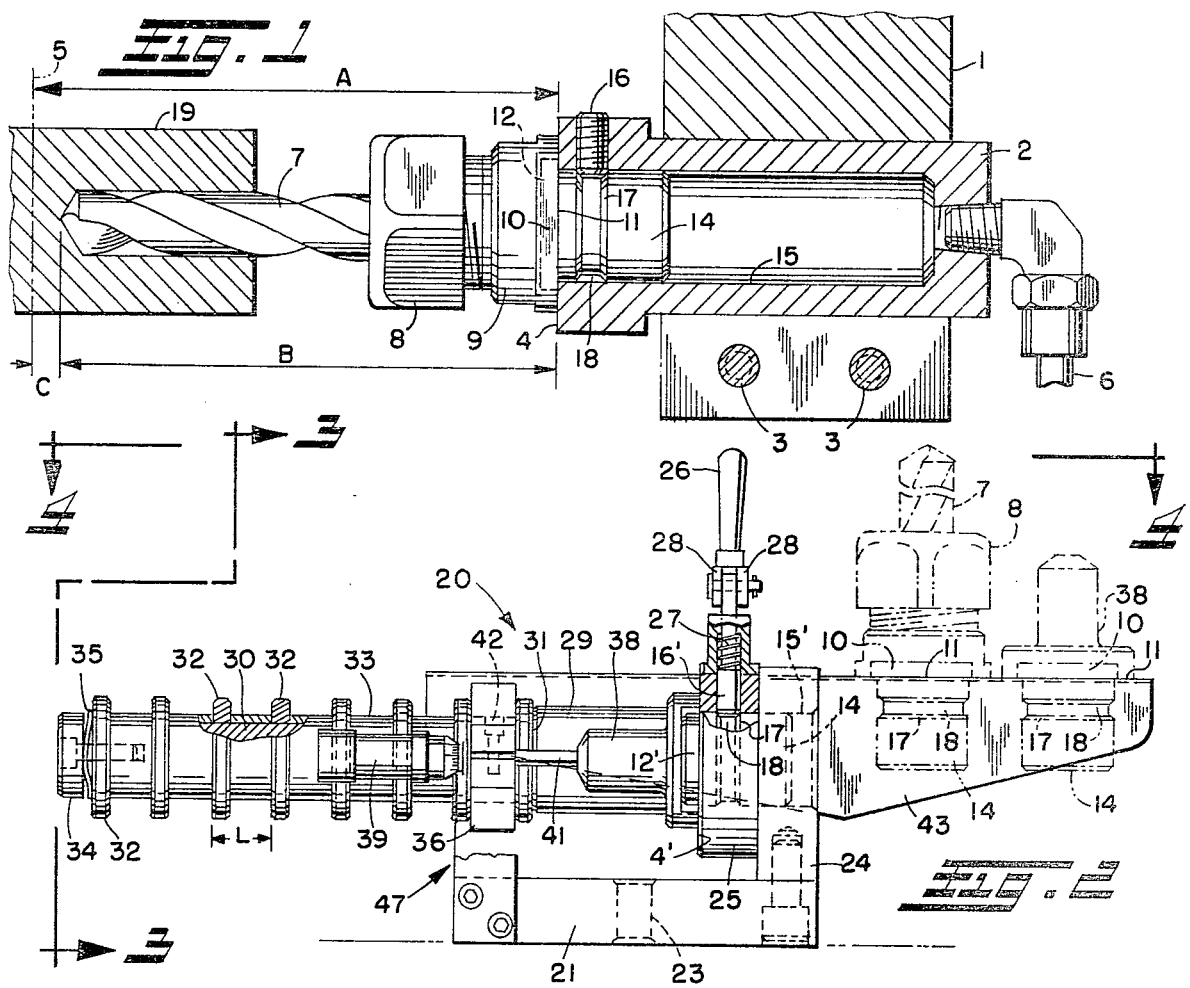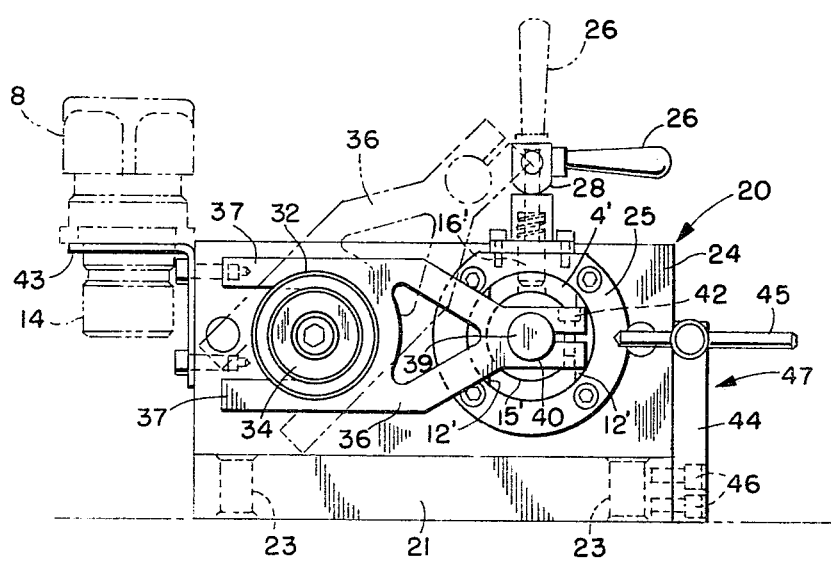

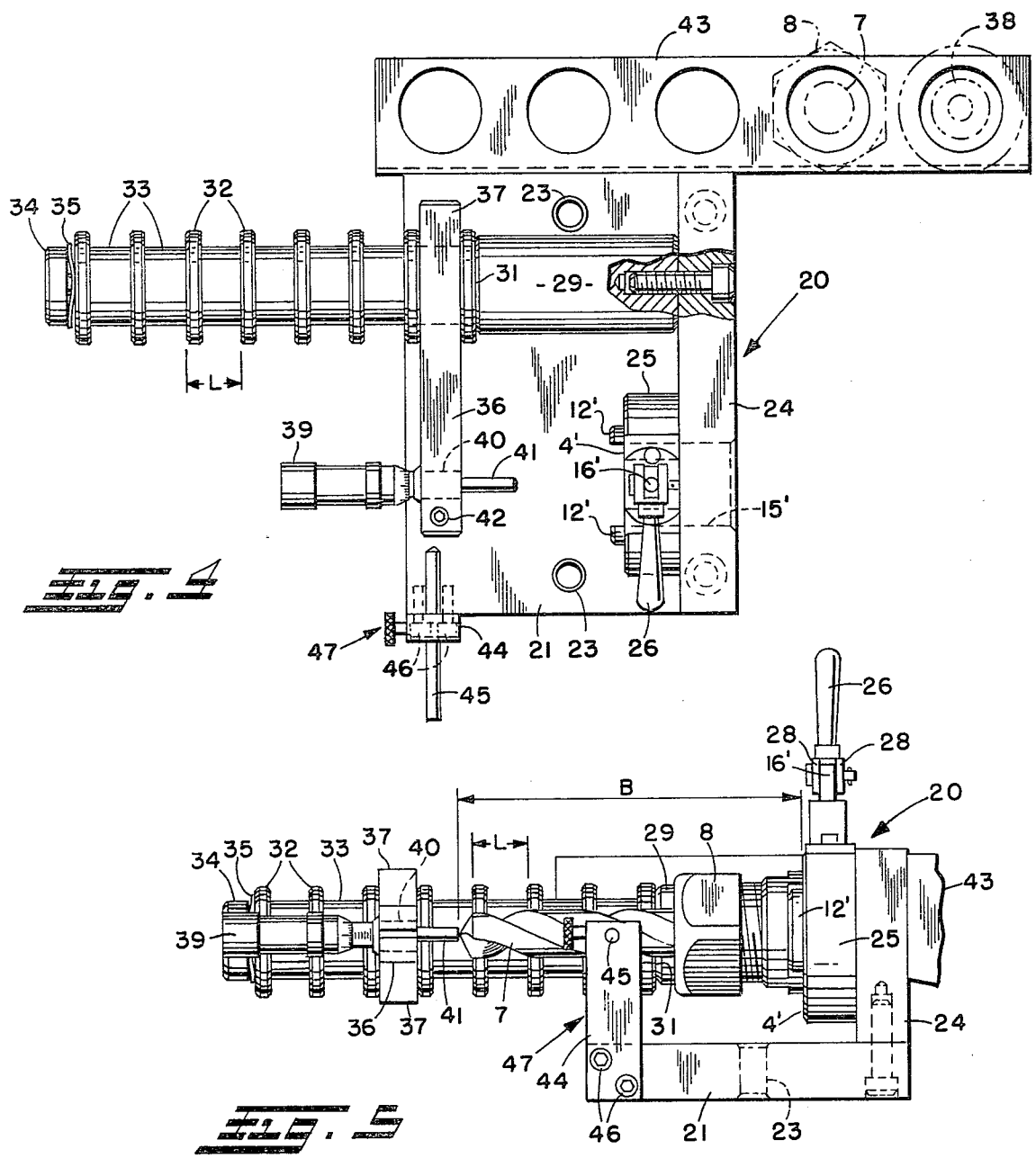

TOOL PRESETTING DEVICE

BACKGROUND OF THE INVENTION

Multiple spindle automatic bar machines generally employ collet chucks for holding end working tools such as drills, spot drills, center drills, counterbores, spot facers, combination drills and countersinks, reamers, end mills, and hollow mills, the integral shanks of the chucks being longitudinally adjustably clamped in the end working tool slides (or auxiliary slides thereon) which are moved toward and away from the spindle carrier. The use of end working tool chucks of the character indicated adds substantially to set-up time in that it entails longitudinal adjustment of the tools in the respective chucks and of the chucks in the end working tool slides with respect to the spindle drum face of the machine. Moreover, replacement of dull or broken tools entails substantial down time of the machine whether the tools are replaced at the machine or in the chucks removed from the machine.

SUMMARY OF THE INVENTION

The tool presetting device herein enables quick and accurate presetting of end cutting tools in any type of tool holder including, for example, end mill holders with set screws and collet chucks. Although the present tool presetting device invention may be used with any type of tool holder, the following description of the invention is limited to a collet chuck holder for purposes of convenience without limiting the scope of the invention to such representative holder example. The tool presetting device has a chuck support which non-rotatably supports a chuck with a locating shoulder thereof held against a locating surface of the chuck support so that the chuck may be tightened to lock the tool in a precisely adjusted position whereat the end of the tool is engaged with a micrometer which is a preset adjustable distance from the locating shoulder of the chuck. The chuck with the preset tool is then merely non-rotatably engaged with a chuck adaptor which is clamped in an end working tool slide of a single or multiple spindle automatic with the chuck shoulder held against the accurately positioned locating surface of the adaptor.

On long production runs, a number of chucks with preset tools may be provided for quick and easy replacement of any chuck having a worn or broken tool therein without any need of adjustment of either the tool or the chuck of the replacement chuck-tool assembly.

The device herein also makes provision for orienting the flutes of a tool such as a drill to permit the performance of a facing or chamfering operation on the end of the bar while the drill is in the drilled hole or while, for example, a center drill is chamfering the end of a hole to be drilled at a succeeding station of the machine.

The tool presetting device herein enables presetting of end cutting tools in chucks in advance so that when one job is completed on the machine, the set-up time for the next job is greatly reduced because insofar as end working tools are concerned all that needs to be done is to clamp the preset chuck-tool assemblies in place against the locating surfaces of the chuck adaptors in the end working tool slides.

Other objects and advantages will appear from the ensuing description.

BRIEF DESCRIPTION OF THE DRAWING

FIG. 1 is a side elevation view, partly in cross-section, showing a preset chuck-tool assembly non-rotatably and axially fixedly connected to a chuck adaptor which has been accurately adjustably clamped in an end working tool slide of a multiple spindle automatic bar machine;

FIG. 2 is a front elevation view of a tool presetting device according to the present invention showing how the device is initially set with reference to a gauge;

FIG. 3 is an elevation view as viewed from the left hand end of FIG. 2;

FIG. 4 is a top plan view as viewed downwardly along the line 4—4, FIG. 2; and

FIG. 5 is a front elevation view similar to FIG. 2 except showing the device in use in presetting the end of a tool, such as a drill, with respect to a reference surface of the device with which a shoulder of the chuck is held in engagement.

DETAILED DESCRIPTION OF A PREFERRED EMBODIMENT

Referring first to FIG. 1, the reference numeral 1 denotes an end working tool slide of a multiple spindle automatic bar machine, chucker, or the like, in which a chuck adaptor 2 is clamped by the screws 3 in accurate predetermined position to provide a predetermined reference dimension A from the end face 4 of the adaptor 2 to the spindle drum face 5 in the closed position of the end working tool slide 1. If desired or necessary, the chuck adaptor 2 may have connected thereto a coolant supply conduit 6. The end cutting tool 7, e.g. a drill is held in a collet chuck which, for example, may be of the type disclosed in Milton L. Benjamin U.S. Pat. No. 3,727,928 granted Apr. 17, 1973, in which the tightening of the nose piece 8 on the chuck body 9 effects contraction of a collet (not shown) into gripping engagement with the shank of the tool 7. If desired, a left hand threaded stop screw (not shown) in the chuck body 9 may be engaged with the shank end of the tool 7 to prevent axial and rotary slipping thereof. The chuck body 9 has parallel flats 10 adjacent the shoulder 11 engaged with face 4 which are engaged by corresponding flats of the diametrically opposite axial projections 12 from the face 4 of the chuck adapter 2. The chuck body 9 has a cylindrical shank 14 which is a close sliding fit in the bore 15 and a set screw 16 in the chuck adaptor 2 engages the rear beveled side 17 of a groove 18 to firmly hold the surfaces 4 and 11 in engagement.

The tool presetting device herein enables accurate setting of the dimension B so that $A - B = C$, the dimension C being predetermined from the set-up chart of the part 19 being machined.

Referring now to FIGS. 2–5, the tool presetting device 20 comprises a base plate 21 which through the mounting holes 23 is adapted to be mounted on a workbench or the like. Secured to the base plate 21 as by screws as shown is a vertical plate 24 having a ring 25 bolted to its inside face, the ring 25 and plate 24 having a bore 15' therethrough of the same diameter as the bore 15 of the chuck adaptor 2 to slidably receive therein the shank 14 of the chuck body 9. The ring 25 also has a reference surface 4' and projections 12' corresponding to the surface 4 and projections 12 of the chuck adaptor 2 for engagement of the shoulder 11 of the chuck body 9 with surface 4' and for non-rotary engagement of the flats 10 of the chuck body 9 between the flats of the projections 12'.

A spring actuated pin 16' corresponding to set screw 16 enters the groove 18 of the chuck body 9 to bear upon the inclined flank 17 to yieldably hold the locating shoulder 11 against face 4'. When the handle 26 is swung from vertical position to horizontal position, the pin 16' is radially outwardly retracted out of the groove 18 against the spring 27 by cam 28 of handle 26 for axial withdrawal and insertion of successive chuck bodies 9.

Bolted to the vertical plate 24 rearwardly spaced from the bore 15' is an elongated bar 29 which is parallel to the axis of the bore 15' and which has on the reduced extension 30 from shoulder 31 a series of rings 32 and spacer sleeves 33 which are yieldably urged into butting engagement with one another and with shoulder 31 by means of a ring 34 which is bolted to the end of extension 30 with a spring washer 35 between the ring 34 and the last ring 32. By way of example, each ring 32 may be of ¼ inch thickness and each spacer 33 may be ¾ inch thickness so that the dimension L from one ring 32 to the next is 1 inch within close limits. The spacers 33 and rings 32 may be sorted according to thickness and selectively assembled on extension 30 so that there is no appreciable accumulation of tolerances on either the plus side or negative side in a direction away from the vertical plate 24.

A forked micrometer holder 36 slightly thicker than the spacers 33 between successive rings 32 has parallel arms 37 for insertion between successive rings 32 to straddle the spacer 33 therebetween. By reason of spring 35 the holder 36 is frictionally held between successive rings 32 for swinging movement between the solid line and phantom line positions as shown in FIG. 3.

For initial setting of the device 1, a gauge 38 is provided which has the same configuration as the chuck body 9 from the flats 10 and including shoulder 11, shank 14, and groove 18 with beveled flank 17. When the shank 14 of the gauge 38 has been inserted into bore 15' and held by pin 16' as shown in FIG. 2, the dimension of the gauge from the locating shoulder 11 to the end thereof is say 2.000 inch and when the holder 36 is inserted between the first two rings 32 and swung to the horizontal position of FIGS. 2 and 3 a micrometer 39 set to "0" is inserted in the bore 40 of the holder 36 until the end of the micrometer spindle 41 engages the end of the gauge 38 whereupon the screw 42 may be tightened to clamp the micrometer 39 in this position. When the holder 36 is swung up to the phantom line position of FIG. 3, the pin 16' actuating handle 26 may be swung to horizontal position to withdraw the pin 16' from the groove 18 whereupon the gauge 38 may be withdrawn from the bore 15'. For convenience for storing the gauge 38 and preset chuck-tool assemblies, an apertured rack 43 is bolted to the vertical plate 24 to support the gauge 38 and chuck-tool assemblies in vertical position as shown in FIG. 2.

In the use of the tool presetting device 20, the micrometer 39 is set to the decimal of the desired setting B of the tool 7 from the shoulder 11 and the holder 36 is placed between the rings 32 corresponding to the whole number of the desired setting B. As apparent, when the holder 36 is between the first two rings 32 the micrometer spindle 41 may be preset to any dimension B from the locating surface 4' between 2.000 inch and 3.000 inch when the micrometer 39 has a range from 0.000 to 1.000 inch. Similarly, when the holder 36 is inserted between the second and third rings 32 the range of dimension B will be 3.000 to 4.000 inch and so on for each succeeding pair of rings 32.

In the example given in FIG. 5, the end cutting tool 7 is a drill which has been inserted into the collet within nose piece 8 of the chuck and the holder 36 has been inserted in the 6.000 inch groove of the bar 29 with the micrometer 39 set to say 0.125 inch to set the dimension B between the reference surface 4' and the end of the spindle 41 to 6.125 inch. With the micrometer 39 thus set and with the holder 36 in the upwardly swung position, the shank 14 of the chuck body 9 is inserted into the bore 15' to engage shoulder 11 with face 4' and to position the flats 10 between the flats of the projections 12'. The handle 26 is swung up so that the spring 27 urges the pin 16' into engagement with beveled side 17 of the groove 18 to hold the locating shoulder 11 against face 4'. With the nose piece 8 in finger tight condition, the drill 7 is slid back so that the end of the drill 7 is spaced to the right of the end of the spindle 41 whereupon the holder 36 may be swung down to horizontal position to align the spindle 41 with the axis of the drill 7. Thereupon, the drill 7 may be slid forwardly to the left until its end engages the end of the spindle 41 whereupon the nose piece 8 may be tightened as by a wrench to lock the drill 7 at the present position in which the dimension B is 6.125 inch. If a set screw is provided within shank 14, it may be turned into engagement with the shank end of the tool 7 or this may be done after the preset tool-chuck assembly has been removed from the device 20. To remove the preset tool-chuck assembly, the holder 36 is swung upwardly and the handle 26 is swung to horizontal position to withdraw the pin 16' from the groove 18 whereupon the preset tool-chuck assembly may be withdrawn from the bore 15'. As aforesaid, the present tool-chuck assembly may be supported in a hole in the rack 43 and the next tool is ready for presetting to the same or different dimension B.

It is to be understood that a dial indicator or the like on the holder 36 may be used in place of the micrometer 39 in setting the desired dimension B.

Another feature of the tool presetting device 20 herein is the provision of a drill flute locator 47 for rotary orientation of the drill 7 so that for example a facing operation may be performed on the part 19 while the drill 7 or a combination drill and countersink is in the drilled hole. The flute locator 47 comprises a vertical support 44 longitudinally adjustably carrying a pin 45 which is adapted to be moved toward the slide of the drill 7 so that the drill 7 may be turned to position a flute opposite the end of the pin 45. The locator 47 may be adjustably positioned on the base plate 21 so that the axis of the pin 45 can be preset from the locating face 4'. However, when the facing operation is done in connection with the combination center drilling and chamfering operation, the locator 47 may be secured by screws 46 in fixed position on base plate 21 because a flute of the enlarged chamfering or countersinking portion of the tool may readily be visibly aligned with the pin 45 without requiring entry of the end of the pin 45 into the flute.

As a typical example, a bushing blank may be made on a 5-spindle automatic as follows:

Spindle #1—Center drill and countersink and face end of bar
Spindle #2—Drill part way and rough form O.D.
Spindle #3—Additional drill depth Spindle #4—Additional drill depth to final depth beyond length of blank and finish form O.D.

Spindle #5—Ream drilled hole and cutoff blank

An auxiliary slide will be provided for the ream operation at Spindle #5 in view of the long stroke and much greater feed which may be several times that of the drilling operations at Spindles #2, #3, and #4.

The embodiments of the invention in which an exclusive property or privilege is claimed are defined as follows:

1. A device for presetting an end working tool in a tool holder having tool gripping means at one end operative selectively to permit longitudinal adjustment of the tool with respect to the tool holder and to lock the tool in adjusted position and having a shank at the other end forming a locating shoulder; said device comprising a tool holder support having a bore to slidably receive said shank for engagement of said shoulder with a locating face of said support; an elongated bar secured to said support in spaced parallel relation to the axis of said bore; said bar having a series of uniform axially spaced apart peripheral grooves; an adjustable member extending radially from said bar with one end frictionally insertable into any groove for course adjustment of said member toward and away from said locating face in increments corresponding to the spacing of said grooves; said adjustable member having fine adjustment means at its other end adapted to be adjusted toward and away from said locating face against which the end of a tool is adapted to be engaged by longitudinal adjustment of the tool with respect to said locating shoulder and locating face; said adjustable member being swingable about the axis of said bar to a position whereat said other end of said adjustable member and said fine adjustment means laterally clears said bore for axial insertion and withdrawal of said shank into and from said bore.

2. The device of claim 1 wherein said fine adjustment means comprises a micrometer secured at said other end of said adjustable member for fine adjustment with respect to said locating face.

3. The device of claim 1 wherein said grooves are defined by alternate series of rings and spacers on said bar which are spring loaded into abutting engagement with one another, the ring nearest the locating face being engaged with a shoulder on said bar; and wherein said one end of said adjustable member is of axial thickness slightly greater than the axial thickness of each spacer whereby said member is yieldably retained in any selected groove for swinging movement as aforesaid.

4. The device of claim 1 wherein the coarse adjustment of said member is in one inch increments while the fine adjustment means provides for fine adjustment of the decimal portion or fractional portion of the desired presetting of the end of the tool from the locating shoulder of the tool holder.

5. The device of claim 1 wherein a rack is secured on said tool holder support having a plurality of openings to receive the shanks of tool holders to support the tool holders and tools therein in vertical position by said locating shoulders resting on said rack.

6. The device of claim 1 wherein said support has a transverse pin which is adjustable toward and away from the axis of the tool whereby a preset fluted tool may be angularly oriented about its axis to align a flute of the tool with the end of said transverse pin.

7. The device of claim 1 wherein said tool holder support and tool holder have axially interfitting non-circular cross section portions to prevent relative rotation of said tool holder and chuck tool holder when said shank is inserted into said bore with said locating shoulder engaged with said locating face.

8. The device of claim 1 wherein said tool holder support has means for yieldably holding said locating shoulder and locating face in engagement.

9. The device of claim 8 wherein said yieldable means comprises a spring-actuated pin which is moved radially inwardly into a peripheral groove of said shank to hold said locating shoulder in engagement with said locating face.

10. The device of claim 9 wherein said tool holder support has means for radially outwardly withdrawing said spring-actuated pin from said shank groove to permit axial withdrawal of said shank from said bore.

* * * * *